US012764840B2

(12) United States Patent
Alfier et al.

(10) Patent No.: US 12,764,840 B2
(45) Date of Patent: Oct. 13, 2026

(54) METHOD FOR DETECTING AND PROCESSING PHOTOMETRIC PARAMETERS OF LIGHTING DEVICES, AND CORRESPONDING COMPUTER PROGRAM PRODUCT AND CONTROLLER

(71) Applicant: Clay Paky S.r.l., Seriate Bergamo (IT)

(72) Inventors: Alberto Alfier, Vedelago Treviso (IT); Xiaolong Li, Montebelluna Treviso (IT); Andrea Morra, Padua (IT); Massimiliano Pesenti, Seriate Bergamo (IT); Massimo Callegari, Seriate Bergamo (IT)

(73) Assignee: Clay Paky S.r.l., Seriate Bergamo (IT)

( * ) Notice: Subject to any disclaimer, the term of this patent is extended or adjusted under 35 U.S.C. 154(b) by 0 days.

(21) Appl. No.: 18/857,256

(22) PCT Filed: Mar. 27, 2023

(86) PCT No.: PCT/IB2023/053017

§ 371 (c)(1),
(2) Date: Oct. 16, 2024

(87) PCT Pub. No.: WO2023/203404

PCT Pub. Date: Oct. 26, 2023

(65) Prior Publication Data

US 2025/0275028 A1 Aug. 28, 2025

(30) Foreign Application Priority Data

Apr. 21, 2022 (IT) ........................ 102022000007916

(51) Int. Cl.

| | |
|---|---|
| ***H05B 45/22*** | (2020.01) |
| ***G01J 1/42*** | (2006.01) |
| ***G01J 1/44*** | (2006.01) |

(52) U.S. Cl.
CPC ............ *H05B 45/22* (2020.01); *G01J 1/4257* (2013.01); *G01J 1/44* (2013.01); *G01J 2001/4247* (2013.01)

(58) Field of Classification Search
None
See application file for complete search history.

(56) References Cited

U.S. PATENT DOCUMENTS 6,473,062 B1 * 10/2002 Debiez .................. H04N 1/401 345/55
7,893,633 B2 * 2/2011 Pedersen ................ H05B 45/28 315/318

(Continued)

OTHER PUBLICATIONS

International Search Report and Written Opinion dated Jun. 7, 2023. 132 pages.

*Primary Examiner* — Kenneth B Wells
(74) *Attorney, Agent, or Firm* — RMCK Law Group PLC

(57) ABSTRACT

Photometric calibration data for lighting devices that include a plurality of electrically powered light radiation sources are obtained by positioning a photometric sensor configured to be impinged upon by light radiation emitted by a lighting device. There is detected, via the sensor and with the device deactivated, a background lighting level signal. There are then detected, via the sensor and with the device activated, light-emission signals, which are processed on the basis of the background-lighting level signal to obtain clean emission signals. The photometric calibration data are produced starting from said clean emission signals and can be used both for (re)calibrating the emission parameters of the same lighting device with respect to which the sensor has been positioned and for modifying the light emission parameters of one or more cloned lighting devices other than the lighting device with respect to which the sensor has been positioned.

12 Claims, 3 Drawing Sheets

(56) References Cited

U.S. PATENT DOCUMENTS

Figure 1:
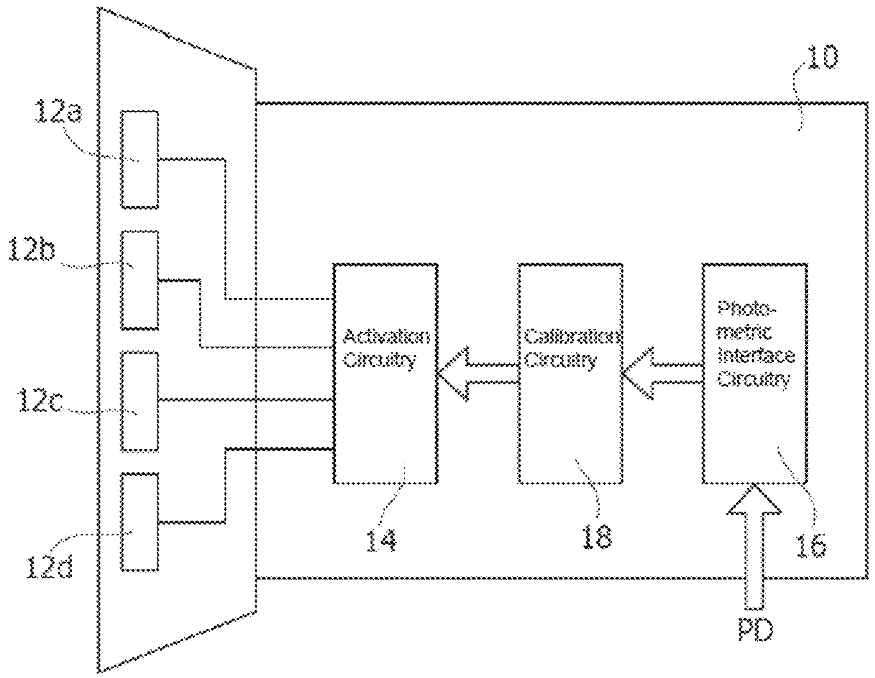

| | | | | |
|---|---|---|---|---|
| 9,018,853 | B2 * | 4/2015 | Johannessen | H05B 45/46 315/318 |
| 9,952,095 | B1 * | 4/2018 | Hotelling | A61B 5/7225 |
| 2002/0159276 | A1 * | 10/2002 | Deboy | H02M 3/33507 363/20 |
| 2004/0105261 | A1 | 6/2004 | Ducharme et al. | |
| 2004/0105264 | A1 | 6/2004 | Spero | |
| 2007/0247414 | A1 | 10/2007 | Roberts | |
| 2011/0115404 | A1 | 5/2011 | Morgenbrod | |

* cited by examiner

METHOD FOR DETECTING AND PROCESSING PHOTOMETRIC PARAMETERS OF LIGHTING DEVICES, AND CORRESPONDING COMPUTER PROGRAM PRODUCT AND CONTROLLER

CROSS-REFERENCE TO RELATED APPLICATIONS

This application is a 371 National Stage of International Application No. PCT/IB2023/053017, filed Mar. 27, 2023, which claims priority to Italian Patent Application No. 102022000007916 filed Apr. 21, 2022. The disclosure of each of the above applications is incorporated herein by reference in its entirety.

TECHNICAL FIELD

The present disclosure relates to lighting devices.

One or more embodiments may be applied to lighting devices that use electrically powered light-radiation sources.

These may, for example, be solid-state light-radiation sources, such as LED sources.

TECHNICAL BACKGROUND

Light-radiation sources, such as solid-state sources, can be used for generating light radiation at colour points chosen within a rather extensive range. This principle may be applied also for generating white radiation with different colour temperatures.

This result may be achieved, for example, using LED sources of different colour (including white LEDs), hence LEDs of different types, i.e., light-radiation sources that have respective light-emission spectra. Known and used are solutions in which three or more (sets of) LEDs with different chromatic characteristics are used.

The colours thus made available are able to define a corresponding gamut within a system of chromatic co-ordinates (e.g., the CIE 1931 colour space). By combining the light radiation of the different (sets of) LEDs, each with a respective flux value, it is possible to generate light radiation virtually corresponding to any colour point within the aforesaid gamut.

The processes for manufacturing light-radiation sources, such as LED sources, are subject to tolerances (appreciable also at the level of end user), for example, in relation to parameters such as flux, colour co-ordinates, forward voltage, thermal resistance, and/or location of the individual chip within a package. These factors may give rise to variable characteristics of the radiation emitted.

For this reason, it is common practice to proceed to operations of calibration of the devices (for example, as they come off the production line) with the intent of giving rise to characteristics that are similar in terms of light radiation perceived.

This procedure can satisfy the need to obtain a uniform light radiation (only) at start of the service life of the device.

After the devices have been used for a certain period of time (i.e., during their lifetime, as is normally said in the sector) sources such as LED sources may undergo ageing phenomena such as to lead to a deterioration of the characteristics of emission at the level of flux and colour.

This effect may depend, for example, upon the working conditions (in particular upon the temperature). It may be noted in fact that devices comprised in one and the same system (understood as installation of a number of devices of the same type-simplest case—or as installation of a number of devices of different types to obtain given lighting effects—more complex case) may be used in a different way and may hence present behaviours of ageing that differ from device to device.

It may also be noted that the aforesaid ageing phenomena present intrinsic characteristics of variability so that even two devices used exactly in the same conditions may behave differently at the level of ageing, for example as regards the possible variations or drifts of the colour co-ordinates of the radiation emitted or of the flux emitted.

This phenomenon may be noted in particular when sources (for example, LED sources) of different colour are used, the radiations of which are mixed in a device to obtain light radiation with a certain colour. Coloured LEDs may, in fact, present a variation of the operating parameters that is more marked as compared to white LEDs, in particular as regards colour co-ordinates and flux.

The prior Italian patent application 102018000006462 tackles this problem in a lighting device comprising a plurality of sets of electrically powered light-radiation sources, e.g., LED sources, with each set that comprises at least one light-radiation source and has a respective light-emission spectrum.

The solution described in the above document envisages the use of activation circuitry for activating the light-radiation sources:

i) in a first mode, where the light-radiation sources are activated as a function of respective activation parameters; and ii) in at least one second mode, where the sets of light-radiation sources of said plurality of sets of light-radiation sources are activated individually or else by activating jointly a number of sets of light-radiation sources, which have non-overlapping light-emission spectra.

There is envisaged photometric-interface circuitry, which receives sets of photometric data detected with the light-radiation sources activated in the aforesaid second mode, with calibration circuitry coupled to the photometric-interface circuitry and to the activation circuitry. The calibration circuitry is configured to modify the activation parameters of the sources as a function of the photometric data received by the photometric-interface circuitry.

Albeit proving altogether satisfactory from various points of view, this prior solution may be further improved from the standpoint of the signal-to-noise (S/N) ratio, which may prove too low to yield reliable detection results also in the case of a scene dominated by a background light at a certain wavelength: for example, a white LED dominated by a blue peak and by a yellow-conversion phosphor, hence with an S/N ratio that may be lower in the blue and yellow regions.

The prior solution may likewise be improved also as regards other aspects, for example, the support provided remotely to users for carrying out the calibration operation, or updating of the calibration tools (e.g., software tools) provided to the users.

In principle, one could think of tackling these aspects using some special DMX channels in the apparatus to control each type of LED directly, leaving to the user the possibility of adjusting the variation of colour manually if the colour of the light emission is not satisfactory.

Irrespective of any other consideration, the above solution would solve the problem linked to deviation of the colour of light emission only in a particular colour point, with the need to repeat manual adjustment for each point within the gamut available: in all evidence this solution appears hardly acceptable for the end user.

Issues that are as a whole related may emerge in a context where it is desired to be able to clone a given lighting apparatus or fixture (a spotlight) by making it possible for one or more fixtures—even of different types—to be calibrated so as to reproduce the characteristics (for example, colour point and flux) of a lighting apparatus taken as reference. Requirements of this nature may arise, for example, in film or television studios.

It will again be noted that the light-radiation sources present in the devices or fixtures described previously may be either coloured sources (e.g., LED sources), or sources (solid-state sources or sources of a different type, such as incandescent sources) with an as a whole white emission, associated to which are selective filters (gelatins or dichroic filters of various nature) such as to give rise to a coloured emission.

The present description is hence not to be read as being limited to solid-state light-radiation sources, for example LED sources.

OBJECT AND SUMMARY

The object of one or more embodiments is to contribute to providing a further improved solution to overcome the limitations outlined above.

According to one or more embodiments, the above object may be achieved thanks to a method having the characteristics recalled in the ensuing claims.

One or more embodiments may also regard a corresponding computer product, comprising portions of software code, which, when loaded into a control device of a lighting system, can cause that system to operate with a method according to the embodiments.

One or more embodiments may also regard a corresponding controller device.

The claims form an integral part of the technical teachings provided herein in relation to the embodiments.

The solution proposed herein envisages obtaining photometric calibration data for lighting devices that comprise a plurality of electrically powered light-radiation sources by positioning a photometric sensor configured to be impinged upon by light radiation emitted by a lighting device.

The above device may be either the same device in self-calibration mode or a different device the emission characteristics of which are to be reproduced.

Once a background-lighting level signal (Noise) is detected, via the photometric sensor and with the device with respect to which the sensor itself has been positioned kept deactivated, there are then detected light-emission signals (Noisy Signal; Noisy ColorSignal), via the photometric sensor and with the device with respect to which the sensor itself has been positioned activated.

The above light-emission signals (NoisySignal; NoisyColorSignal) are processed on the basis of the background-lighting level signal (Noise) to obtain as result clean emission signals (CleanSignal; CleanColorSignal).

The photometric calibration data are produced starting from the above clean emission signals (CleanSignal; CleanColorSignal) and may be used:

both for (re)calibrating the emission parameters of the lighting device itself with respect to which the photometric sensor has been positioned and for modifying the light-emission parameters of one or more cloned lighting devices other than the lighting device with respect to which the photometric sensor has been positioned.

The solution proposed herein is able to ensure a good degree of uniformity of colour with an adequate precision and/or accuracy of the colour (within the limits of the measuring instrument) during the life cycle of a lighting apparatus.

The term "uniformity" refers to the possibility of obtaining a desired colour (with a given accuracy) with (substantially all) the apparatuses involved capable of obtaining this result (with a given precision).

The foregoing facilitates compensation of the value of the flux and of the colour co-ordinates of each type of LED comprised in a lighting apparatus, with an operation that can be performed at any moment, using sensors external to the apparatus.

In particular, the solution proposed herein:

facilitates calibration of an in-field apparatus, with the capacity of taking into account environmental conditions that might disturb the calibration procedure; and is able to support the users remotely in the use and updating of the assisted calibration tools under the supervision of the producer.

One or more embodiments may afford one or more of the following advantages:

the calibration can be carried out without having to displace the lighting apparatuses or fixtures from the installation site/position;

the fixture can be calibrated (like at the end of the production line) also on the installation site, at any moment, for example following upon a request/warning issued by the fixture or on the initiative of the end user; and it is possible to exploit processing capacities at a cloud level, limiting the hardware needs of the remote controller to what is required for it to function as connection node.

As already mentioned, the solution described herein is likewise suited to being used also in contexts (for example, in film or television studios), where it is desired to be able to clone a given lighting apparatus taken as reference, making it possible for one or more other lighting apparatuses to be calibrated so as to reproduce the characteristics (for example, colour point and flux) of the lighting apparatus taken as reference.

BRIEF DESCRIPTION OF ANNEXED DRAWINGS

Figure 2:
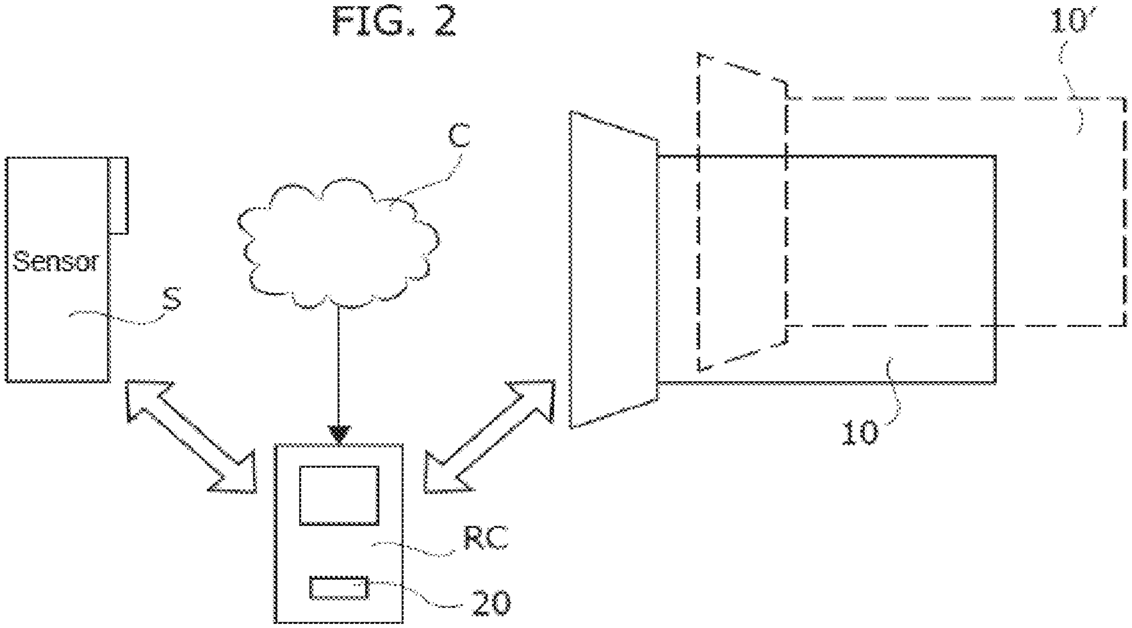
Figure 3A:
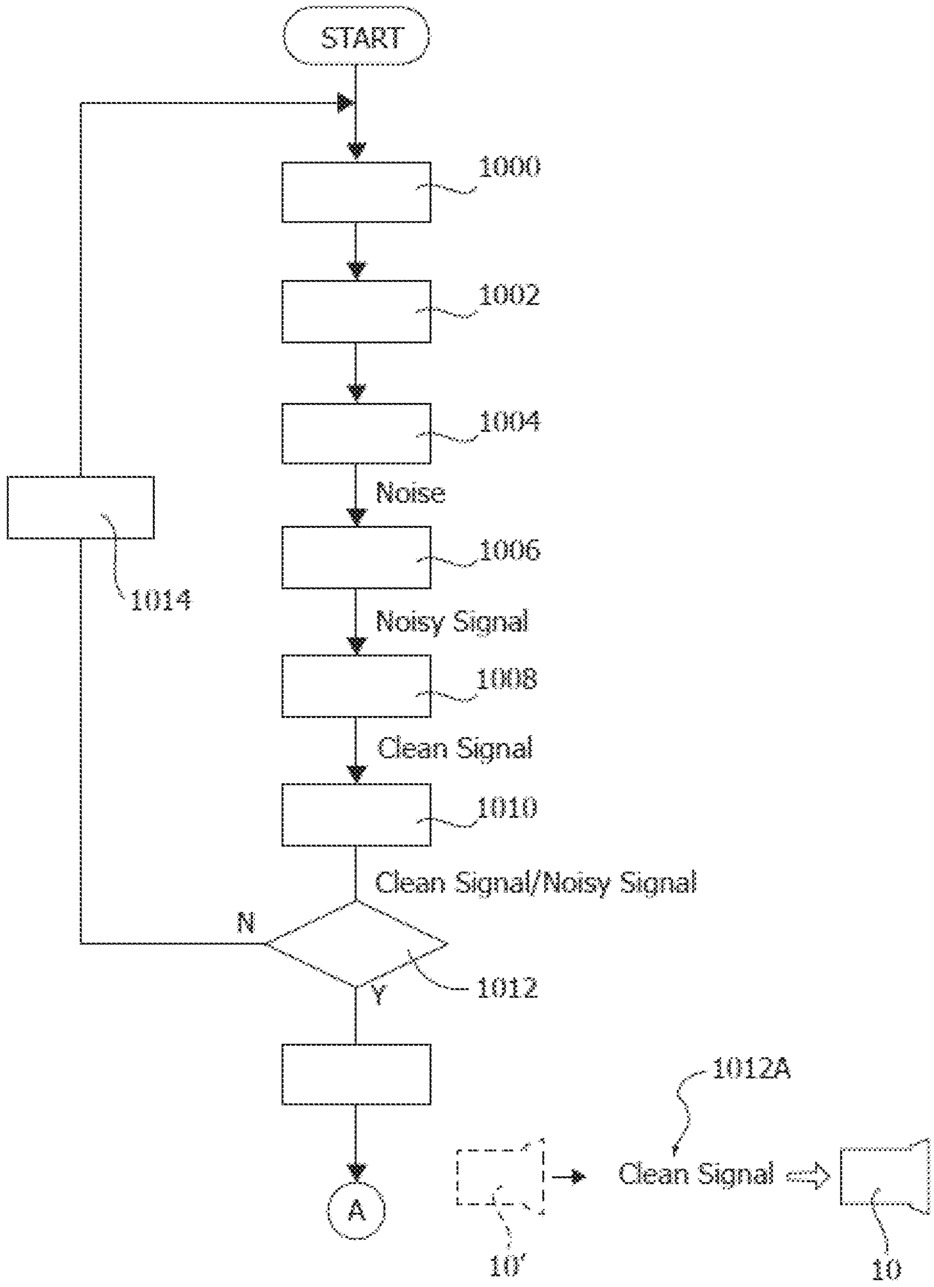
Figure 3B:
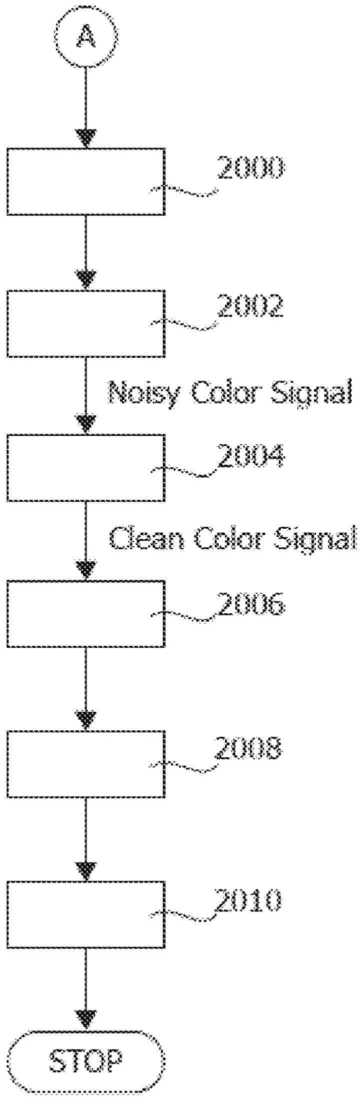

One or more embodiments will now be described, purely by way of non-limiting example, with reference to the annexed drawings, wherein:

FIG. 1 represents a lighting device that can be applied to embodiments of the present description;

FIG. 2 exemplifies various possible solutions of use of the above device; and FIGS. 3A and 3B jointly present a flowchart exemplifying possible modes of use of embodiments.

DETAILED DESCRIPTION

In the ensuing description, one or more specific details are illustrated in order to enable an in-depth understanding of the examples of the embodiments of this disclosure. The embodiments may be obtained without one or more of the specific details or with other methods, components, materials, etc. In other cases, known operations, materials, or structures are not illustrated or described in detail so that certain aspects of the embodiments will not be obscured.

Reference to "an embodiment" or "one embodiment" in the framework of the present description is intended to indicate that a particular configuration, structure, or characteristic described with reference to the embodiment is comprised in at least one embodiment. Consequently, phrases such as "in an embodiment" or "in one embodiment" that may be present in one or more points of the present description do not necessarily refer precisely to one and the same embodiment. Moreover, particular conformations, structures, or characteristics may be combined in any adequate way in one or more embodiments.

The references used herein are provided merely for convenience and hence do not define the sphere of protection or the scope of the embodiments.

In FIG. 1, the reference number 10 designates a lighting device or fixture comprising a plurality of electrically powered light-radiation sources 12*a*, 12*b*, 12*c*, 12*d*.

In one or more embodiments, these may be solid-state light-radiation sources, for example LED sources. As already mentioned, in addition to coloured sources (e.g., LED sources), the above sources may be sources (solid-state sources or sources of a different type, such as incandescent sources) with an as a whole white emission with associated selective filters (gelatins or dichroic filters of various nature) such as to give rise to a coloured emission. The present description is hence not to be read as being limited to solid-state light-radiation sources, for example LED sources.

In a device or fixture 10 of the type considered herein, each light-radiation source 12*a*, 12*b*, 12*c*, 12*d* comprises at least one light generator operating in a respective spectral range (range of emission wavelengths), also with a possible overlapping between emission ranges of different sources.

For instance, the sources in question may comprise sources in the red and blue ranges (the emission spectra of which in general do not overlap) together with a source in the amber range, the emission range of which overlaps in certain wavelengths the red emission range.

Reference to four light-radiation sources has of course merely an exemplifying nature: the number of such light-radiation sources (whether single or multiple, in the sense that each source may in turn comprise a number of generators of radiation, for example a number of LEDs with homogeneous characteristics of emission) may be any, optionally at least three.

The reference numeral 14 designates circuits for activation of the light-radiation sources 12*a*, . . . , 12*d* configured so as to be able to activate these sources in accordance with respective activation parameters, such as the intensity of the flux of light radiation emitted.

As is known, the above parameter may be controlled by selectively varying, for example, the mean value of the voltage or of the supply current of the sources.

The activation circuits 14 may be configured—also here in a way in itself known—for activating the various light-radiation sources 12*a*, . . . , 12*d* either all together or individually.

The mode of simultaneous activation of the various light-radiation sources 12*a*, . . . , 12*d* makes it possible to obtain (once again in a way in itself known, so that any more detailed description herein becomes superfluous) an effect of mixing of the respective light radiations such as to give rise to a resulting light radiation having desired chromatic characteristics, for example given chromatic co-ordinates or a certain CCT (Correlated Colour Temperature) of the resulting radiation.

In FIG. 1, the reference numeral 16 designates photometric-interface circuits that are configured to receive respective sets of photometric data PD obtained starting from light radiation emitted by sources such as the sources 12*a*, . . . , 12*d*, for example using a sensor device S, as discussed in what follows.

This may occur when the light-radiation sources 12*a*, . . . , 12*d* are activated with the mode of selective activation of individual sources or the mode of simultaneous activation of a number of light-radiation sources.

Once again in the diagram of FIG. 1, the reference numeral 18 designates calibration circuits coupled both to the activation circuits 14 and to the photometric-interface circuits 16.

The calibration circuits 18 may be configured so as to be able to vary selectively the activation parameters (for example, the intensity of the flux of radiation emitted) of the various sources 12*a*, . . . , 12*d* as a function of the photometric data PD received by the photometric-interface circuits 16.

It is current practice to proceed to operations of calibration of the devices (for example, at output from the production line) with the intent of giving rise to similar characteristics in terms of light radiation perceived. This operation od calibration as a function of the photometric data PD may be made according to criteria to be deemed known in the sector and hence such as not to require being recalled in detail herein.

In this regard, it will be appreciated that the present description does not specifically regard the way (in itself known) in which the sources 12*a*, 12*b*, 12*c* and 12*d* can be calibrated as a function of the photometric data PD.

The present description tackles, instead, primarily the problem linked to the possibility of varying the behaviour (for example, at the level of intensity and/or spectrum) of the sources 12*a*, . . . , 12*d* during the service life of the device or fixture 10, so that, albeit in the presence of a calibration performed at the start of the service life (for example, at output from the production line), it proves advantageous to be able to conduct one or more operations of (re) calibration of the device or fixture 10 performed in-field, i.e., during the service life of the lighting device or fixture, hopefully without having to displace the device or fixture from its installation site/position.

It should, in fact, be taken into account that the variations of the behaviour (for example, at a level of intensity and/or spectrum) of the sources 12*a*, . . . , 12*d* during their service life arise in a way not known beforehand or, at best, in a way that can be estimated via extrapolation. Such an extrapolation is, however, frequently affected by significant errors and cannot hence be exploited as basis within functions (e.g., at a firmware level) of the fixture 10 that can be used in a reliable way in order to intervene in the activation circuits 14 so as to be able to compensate possibly for the aforesaid ageing effects.

As already mentioned, the solution described herein is also suited to being used in a context where it is desired to be able to clone a given lighting fixture (a spotlight) by making it possible—as schematically represented in FIG. 2—for one or more lighting fixtures 10 to be calibrated so as to reproduce the characteristics (for example, colour point and flux) of a lighting fixture 10' taken as reference, operating starting from photometric data PD derived from the above fixture 10' taken as reference.

Once again it will be noted that the light-radiation sources involved may be, in addition to coloured sources (e.g., LED sources), sources (solid-state sources or sources of a different type, such as incandescent sources) with an as a whole white emission with associated selective filters (gelatins or dichroic filters of various nature) such as to give rise to a coloured emission.

The present description is hence not to be read as being limited to solid-state light-radiation sources, for example LED sources.

In FIG. 2, the reference S denotes a measurement system, in brief a sensor capable of detecting photometric values of the light radiation emitted by sources such as the sources 12*a*, 12*b*, 12*c* and 12*d* of a lighting device 10 (or 10', in the case of the cloning function already referred to previously).

These may, for example, be photometric values such as the plot of the spectrum of the radiation emitted as a function of the wavelength S(λ) and/or the light intensity (for example, at the level of illuminance, measured in lux).

As already mentioned, a device like the device 10 is suited to being calibrated—according to criteria in themselves known—via the circuits 18, for example to compensate for the degradation of the characteristics of the light-radiation sources 12*a*, . . . , 12*d* during the service life of the device 10.

The solution described herein is based upon the synergistic use of three main elements used for carrying out a procedure of calibration of a lighting fixture, it being possible for this procedure to be conducted in-field, for example operating remotely.

The first element is the measurement system (sensor) S configured—in a way in itself known—so as to detect the photometric values of a light source, for example:

- the spectrum of emission as a function of the wavelength S(λ); and/or
- the light intensity (normally the illuminance, measured in lux); and/or
- the chromatic co-ordinates (for example, in the CIE 1931 colour space).

The sensor S may be a portable spectrometer of a known type as described, at the date of filing of the present patent application, on the following websites:

http://gloptic.com/p/gl-spectis-1-0-touch/or else https://sensing.konicaminolta.us/products/cl-500a-illuminance-spectrophotometer/

The second element is represented by a device, hereinafter defined as remote controller RC, which interfaces both with the sensor S and with a lighting apparatus or fixture (10 or 10') of the type illustrated in FIG. 1.

The controller RC is suited to functioning as connection terminal to the cloud (designated by C), where it is possible to implement the capacity of filing, processing, and controlling the data involved in the development of the method described hereinafter. In the case where the controller RC cannot be connected to the cloud, the aforesaid computational capacity for control of the sensor S and the fixture 10 and for processing the measurement data can be installed locally, in the controller RC itself.

The third element is a lighting apparatus or fixture of the type illustrated in FIG. 1, comprising three or more types of LEDs 12*a*, 12*b*, 12*c* and 12*d*.

The apparatus designated by 10 is a device that it is desired to be able to calibrate within a "self-calibration" procedure, to compensate for the variations of the characteristics of emission of the sources 12*a*, 12*b*, 12*c* and 12*d* during use of the fixture 10 itself, or else within a "cloning" procedure, so as to reproduce, in one or more fixtures or devices like the fixture 10, the characteristics of emission of another lighting fixture 10' (even of an altogether different type), taken as reference model in such a way that the aforesaid other fixture or fixtures 10 can operate as a sort of clone of the fixture 10', taken as reference model.

As has been seen, there exist in fact contexts of use (for example, film or television studios) in which it is desired to make it possible for one or more other lighting fixtures to be calibrated so as to reproduce the characteristics (for example, colour point CxCy and/or flux) of a lighting apparatus taken as reference.

Integrated in apparatuses like the fixture 10 is a firmware function FW (photometric interface 16 and calibration circuits 18) dedicated to this calibration procedure, which may be carried out according to criteria in themselves known (for example, according to the same modalities adopted for calibration of the fixture 10 at the start of its service life, e.g., when it comes off the production line).

In this regard, it will be appreciated that, in the case of the cloning referred to previously, the fixtures (or fixture) 10 obtained as clones do not necessarily have to be identical either to one another or to the fixture 10' taken as reference, i.e., to have, for example, the same light-radiation sources 12*a*, 12*b*, 12*c*, 12*d* and/or the same calibration circuitry.

For the present purposes, the reference fixture 10' that is cloned may be any apparatus capable of being switched on and generating light radiation that can be measured with the sensor S. The cloning procedure uses the data measured by the sensor S starting from the fixture 10' and processes them as described herein for generating photometric data that, applied to one or more fixtures 10 (which may be the same as one another or different) leads the latter to produce the same colour as that emitted by the fixture 10' taken as reference.

For instance, the fixture taken as reference 10' may be a very simple, non-smart, apparatus simply capable of being switched on or switched off, with the possibility of programming other fixtures 10 so as to reproduce (automatically) the colour of the radiation emitted by the fixture 10'.

In a particularly simple embodiment, the role of the fixture 10' in the cloning step is basically that of being switched on so as to be able to detect via the sensor S (with the procedure exemplified in what follows) its photometric data PD, which are then reproduced by the calibration functions (e.g., 16 and 18 in FIG. 1) of the fixture or fixtures 10 that are cloned starting from the fixture 10'.

The flowchart of FIGS. 3A and 3B exemplifies a procedure of calibration of the device 10.

The functions described previously, like the functions described in what follows, can be activated by pressing a pushbutton 20 of the controller RC.

The above functions exploit the possibility of connecting the device 10 (or 10'), the controller RC, and the sensor S as represented at an ideal level by double-headed arrows in FIG. 2. Such a connection may be implemented in various ways, for example via wireless technology, so as to benefit from the maximum freedom of control and positioning.

Alternatively, also acceptable are connection solutions such as to involve only wired connections or a combination of wired and wireless connections. For an exemplification, which is not on the other hand exhaustive, of such connection modalities, reference may be made to the Italian patent application 102018000006462 already cited at the outset of the present description.

First, the (self-calibration) mode of use will be considered, aimed at compensating for the variations of the characteristics of emission of the sources 12*a*, 12*b*, 12*c* and 12*d* during use of one and the same fixture 10, i.e., in the case where (just) one fixture 10 that is to be (re) calibrated, for example in-field, is involved.

The calibration procedure exemplified in the flowchart of FIGS. 3A and 3B stems from a preliminary START step that envisages identification of one or more fixtures 10 that are to be (re) calibrated, the connection of the fixture 10 and of the sensor S to the remote controller RC, and the possible reduction of the level of lighting in the installation environment in order to reduce the level of background light.

As exemplified in the flowchart of FIGS. 3A and 3B, the calibration procedure is articulated in two substeps:

pre-measurement to determine the signal-to-noise level (blocks 1000 to 1012 in FIG. 3A); and measurement proper of photometric data (blocks 2000 to 2008 in FIG. 3B) and recalibration data (block 2010 in FIG. 3B).

Blocks 1000 and 1002 represent switching-on of the fixture 10 (in any condition: for example, raw mode, white mode, or colour mode) so as to activate the light beam at output, and positioning of the sensor S so that it can be impinged upon by the light beam at output, for example in the central part of the beam.

In block 1004, with the sensor S kept in position, the light emission of the fixture 10 is deactivated so as to be able to measure the background-lighting level (environmental light) and save the resulting spectrum for subsequent processing.

This step enables detection of a background-lighting level corresponding to a background noise that might affect the action of detection of the sensor S, whence the term Noise attributed to the background-lighting level signal.

Block 1006 is a step in which, in successive substeps, the various sources 12*a*, 12*b*, 12*c* or 12*d*—which are assumed to be operating in emission ranges at least in part different, i.e., at least in part not overlapping—are switched on in sequence, and the measurement is made to save the respective spectra, thus obtaining signals referred to as Noisy Signal (i.e., signals affected by noise).

In block 1008, the previous measurements are processed by subtracting the signal Noise from the signals NoisySignal so as to obtain, for the sources (e.g., LEDs) of the various types 12*a*, 12*b*, 12*c*, or 12*d*, signals corresponding to a clean spectrum (signals referred to as CleanSignal, from which there has been subtracted the noise component represented by the background lighting).

In block 1010, the clean spectrum signals may be processed, for example, by converting them into a quantitative colorimetric value, such as illuminance.

The above processing may be made in a way in itself known to persons skilled in the sector, for example, within a CIE1931 colour space.

In this regard, reference may be made, by way of example, to Chapters 16 and 17 of the volume by Schubert E. (2006), "Light-Emitting Diodes" (2nd ed.). Cambridge: Cambridge University Press. doi:10.1017/CB09780511790546.

See, for example:

Chapter 16: "Human eye sensitivity and photometric qualities", pp. 275-291, with formula (16.1) for calculating the flux on p. 284, or Chapter 17: "Colorimetry", in particular section 17.1 "Color-matching functions and chromaticity diagram" on p. 292, with formulas (17.2) to (17.6) to calculate the colour point.

In block 1012 the ratio (e.g., of illuminance) CleanSignal/NoisySignal is evaluated to decide whether to pass to a next step.

The above signal-to-noise ratio may be calculated via integration over the entire visible spectrum (total or global ratio S/N_total), which tends to lead to overestimation of the noise component; or else over specific spectral ranges (ratios S/N_i) for each colour, i.e., for each type of source 12*a*, 12*b*, 12*c*, or 12*d*: for example, in the case of blue, via integration over the range of wavelengths from 430 to 480 nm or, in the case of red, via integration over the range of wavelengths from 600 to 650 nm.

In this way, it is possible to verify that the intensity of the background light in the environment will remain lower than an acceptable level so as not to vitiate the results of the calibration procedure.

It is consequently possible to operate both on as many signal-to-noise ratios of a total (or global) type S/N_total as are the sources 12*a*, 12*b*, 12*c*, 12*d* and on as many ratios S/N_i referring to respective emission spectra of the light-radiation sources 12*a*, 12*b*, 12*c*, 12*d*.

The difference between the signal-to-noise ratios S/N_total and S/N_i is given by how these values are estimated.

Taking as possible example the case of the colour blue (430-480 nm), in the case of a signal-to-noise ratio S/N_total the corresponding spectrum can be converted into a value of flux (see once again by way of example the bibliographical references cited previously) using the entire range of the spectrum of the visible, hence considering (also) wavelengths, for example, at 600 nm, where the value should be zero but in actual fact is different from zero on account of the error/sensitivity of measurement of the instrument S or on account of the background noise.

The ratios S/N_i are, instead, obtained by converting only a certain range of wavelengths (for example, 430-480 nm), which corresponds to processing the values outside this range by assigning to them a zero value even though the value detected may be other than zero on account of variability, uncertainty, or noise.

If even just one of the ratios S/N_total or S/N_i is below an acceptability threshold (negative outcome "N" from substep 1012 of FIG. 3), it is possible to implement (in a block 1014) one or more measures aimed at increasing the (at least relative) intensity of the useful signal, such as:

reducing the distance between the sensor S and the fixture 10; and/or modifying the zoom of the fixture 10 to concentrate more light on the sensor S; and/or other measures that are able to increase the intensity of the useful signal, e.g., operating on frost/diffusers or shaping blades; and/or if a direct control is available, reducing the background lighting, thus increasing the relative intensity of the useful signal with respect to the level of the background lighting.

Then the procedure returns upstream of blocks 1000 and/or 1002.

It will be appreciated that, even though this is not expressed explicitly so as not to overburden the graphic representation, it is envisaged that the substeps of blocks 1006 to 1010 can be repeated for all the colours (LEDs) available 12*a*, 12*b*, 12*c*, 12*d*, implementing the measures of block 1014 when even just one of the signal-to-noise ratios S/N_total and/or S/N_i does not exceed the corresponding acceptability threshold, hence defining as positive outcome "Y" from substep 1012 of FIG. 3 (to pass to the next substep, represented by block 2000) the condition whereby all the signal-to-noise ratios S/N_total and/or S/N_i exceed the corresponding acceptability threshold (which may even be different for different ratios S/N_i).

By way of example, as regards the possible choice of the aforesaid threshold values, it has been found experimentally that the solution described herein proves robust and altogether reliable even though the background noise Noise is twice the clean signal so that it can be used also with lower signal-to-noise ratios (e.g., S/N>0.1, i.e., with a background noise ten times higher than the signal).

Block 2000 marks the start of the step of measurement of the real data within the self-calibration solution exemplified by the flowchart of the ensemble of FIGS. 3A and 3B.

In block 2000, all the sources 12*a*, 12*b*, 12*c*, and 12*d* of the fixture are activated in "Full ON" mode, leaving them turned on for a warm-up time of, for example, approximately 30 seconds.

This value is provided purely by way of example in so far as it is possible to use a different time duration according to the fixture 10 and to the environment. The procedure of block 2000 aims at bringing the sources 12*a*, 12*b*, 12*c*, and 12*d* to a stable thermal level so as to be able to obtain an equally stable measurement.

In block 2002, the fixture 10 is switched off, and, without appreciable delay, only the sources of a certain type (12*a*, 12*b*, 12*c* or 12*d*) that are each time to undergo measurement are switched back on in sequence: the corresponding spectrum data collected with the various measurements are stored as long as the various measurements are in progress in view of the subsequent processing operations (as signals referred to as Noisy ColorSignal).

The data/signals can be filed within the remote controller RC, in an external memory, directly in the fixture 10 or in the cloud C. Yet other storage modes are within the reach of the person skilled in the art.

It will be noted that it is possible to use different combinations of warm-up time (block 2000) and of modes of performance of the operations of block 2002 to obtain optimal data that are repeatable and reliable.

In the substep represented by block 2004, the data obtained in the substep 2002 are processed by subtracting the component referred to as Noise from the component NoisyColorSignal so as to obtain only spectrum data corresponding to a clean signal (referred to as CleanColorSignal).

The substep represented by block 2006 exemplifies the possibility of processing the clean spectrum signal to convert it into a desired quantitative colorimetric value (for example, illuminance). This processing may be carried out in a way in itself known to persons skilled in the art, for example as described in the bibliographical references already cited previously with reference to the substep or block 2010.

Also in this case, for simplicity of illustration, the schematic representation of the flowchart of FIG. 3B expresses the possibility of performing the operations of substeps 2002, 2004, 2006 for all the types of sources (LEDs) 12*a*, 12*b*, 12*c*, and 12*d* present in the fixture 10.

In this regard, it may be noted that—in the case where the component Noise (detected in substep 1004) may be considered substantially non-variable throughout the duration of the measurement process (irrespective of its spectral configuration)—the results are not affected by its presence even though the component Noise is of an intensity higher than the light intensity of the sources (e.g., LEDs) 12*a*, 12*b*, 123*c*, and 12*d* thanks to the processing performed in blocks 2004 and 2006.

Block 2008 represents the operation of saving to memory (according to the modalities to which reference has already been made previously, cloud option included) the data obtained previously so as to be able to use them for the calibration process implemented (in a way in itself known) in the fixture 10 (photometric interface 16 and calibration circuits 18) in the substep designated by 2010.

The substep 2010 hence completes the procedure proposed herein for calibrating a lighting device 10 comprising a plurality of electrically powered light-radiation sources 12*a*, 12*b*, 12*c*, 12*d* by modifying respective light-emission parameters as a function of photometric calibration data PD.

As already mentioned, this operation of calibration as a function of the photometric data PD may be carried out according to criteria to be deemed altogether known in the art and hence such as not to require being recalled in detail hereinafter.

At this point, the fixture 10 can be considered calibrated.

In the case of cloning (involved in which are one or more fixtures 10—the same as one another or different—in such a way that these will reproduce faithfully another fixture 10'—which may even be altogether different-taken as reference model), the procedure previously described is suited to being implemented in a simplified way, in practice exploiting only the part of procedure illustrated in FIG. 3A.

Such a cloning action aims in fact mainly at causing the clone fixture or fixtures 10 to reproduce the colour (e.g., co-ordinates CxCy in a CIE1931 colour space, and possibly the flux) of a fixture 10' taken as reference model.

By way of example, it is possible to contemplate cloning a fixture 10' taken as model that emits a radiation of a pink colour that can be obtained by mixing light radiations of different colours emitted by the sources 12*a*, 12*b*, 12*c*, and 12*d*.

As already mentioned previously, the fixture 10' may be virtually any, and the procedure described herein is able to clone it in any (other) fixture 10 that can be calibrated as a function of the photometric data PD obtained starting from the fixture 10', thus enabling the clone fixture to reproduce the colour of the radiation of the fixture 10'.

In the case of cloning, after having obtained, in substep 1004, the background-lighting level (signal Noise), in substep 1006 it is possible to detect, as NoisySignal, the aforesaid radiation, for example of a pink colour, emitted by the fixture 10'.

The next substep 1008 can hence be executed to obtain the clean signal CleanSignal according to the modalities described previously (e.g., subtraction of the signal Noise from the signal NoisySignal).

The substep 1010 will then envisage calculation of a signal-to-noise ratio CleanSignal/Noisy Signal that is to be compared with a respective acceptability threshold in substep 1012.

Also in this case, in the event where the above signal-to-noise ratio CleanSignal/Noisy Signal does not reach the acceptability threshold (negative outcome N from substep 1012), it is possible to implement the various measures of substep 1014 aimed at increasing the (at least relative) intensity of the useful signal picked up by the sensor S.

In the case of cloning, the positive outcome Y from substep 1012 (signal-to-noise ratio CleanSignal/Noisy Signal that reaches the acceptability threshold) may be viewed as a sort of validation of the signal CleanSignal such as to indicate that this signal can be used for producing photometric data PD that are such as to "photograph" in a precise way (on signals cleaned of the effects of the background noise, i.e., of the component Noise) the operating parameters of the reference fixture 10'. The clean signal CleanSignal can then be used as basis for photometric calibration data PD that are able to calibrate one or more clones 10 (the same as one another or different), as represented schematically by a dashed line and indicated by 1012A in the bottom part of FIG. 3A, with a procedure that can be executed in-field.

In solutions as described herein, the photometric calibration data PD obtained as a function of clean emission signals (CleanSignal or CleanColorSignal) can then be used for modifying:

in the case of self-calibration of one and the same fixture 10, the light-emission parameters of the same lighting device 10 with respect to which the photometric sensor S has been positioned to be impinged upon by light radiation emitted by said light-radiation sources 12*a*, 12*b*, 12*c*, 12*d;* or else in the case of cloning of a fixture 10', the light-emission parameters of (at least) one second lighting device 10 that is different from the device 10' (to be cloned) with respect to which the photometric sensor S has been positioned to be impinged upon by light radiation emitted by the device 10' that is to be cloned.

As has already been noted, the devices 10 and 10' may even have altogether different sources. The cloning solution described herein enables in fact detection (measurement) of the colour used by one (any) lighting fixture, even of third parties, and reproduction thereof with another different lighting fixture.

An important aspect of the solution described herein is represented by the fact that, once the photometric sensor S has been positioned so as to be impinged upon by light radiation emitted by the device 10 or by the device 10', there is detected (substep 1004) via the photometric sensor S—with the radiation sources deactivated—a background-lighting level signal, i.e., the signal Noise.

The above signal Noise is suited to being used in different ways.

The signal Noise may in fact be used for the purposes of measurement of the data in view of calibration (blocks 2000 to 2008 in FIG. 3B), i.e., when there are detected (in substep 2002), with the light-radiation sources 12*a*, 12*b*, 12*c*, 12*d* activated selectively (one at a time), respective light-emission signals NoisyColorSignal that are to be processed (in substep 2004) on the basis of the background-lighting level signal (the signal Noise, precisely) to obtain as result respective clean emission signals CleanColorSignal used for producing (in substeps 2006 and 2008) the photometric calibration data PD, obtained precisely as a function of clean emission signals, i.e., CleanColorSignal.

The signal Noise is likewise suited to being used—even before—in the pre-measurement step (blocks 1000 to 1012 in FIG. 3A) that leads to deciding (in substep 1012) whether and when to proceed to measurement of the data in view of calibration (blocks 2000 to 2008 in FIG. 3B).

The signal Noise is moreover suited to being used in a pre-measurement step (blocks 1000 to 1012 in FIG. 3A) implemented in a simplified way on a device or fixture 10' that is to be cloned using, for the purposes of cloning, a signal CleanSignal cleaned of the effects of the background lighting (signal Noise).

As described herein, in its version preliminary to an action of self-calibration of a certain device or fixture 10, the pre-measurement step of blocks 1000 to 1012 of FIG. 3A comprises the operation of detecting (in substep 1006), via the photometric sensor S and with the light-radiation sources 12*a*, 12*b*, 12*c*, 12*d* activated selectively one after another, respective preliminary light-emission signals, i.e., the signals Noisy Signal.

In substep 1008, the above respective preliminary light-emission signals, i.e., Noisy Signal, are processed on the basis of the background-lighting signal, i.e., the signal Noise, to obtain as result respective preliminary clean emission signals, CleanSignal.

In substep 1010, on the basis of the respective clean preliminary signals CleanSignal and of the background-lighting level signal Noise, signal-to-noise ratios CleanSignal/NoisySignal are calculated (on the overall global visible spectrum and on portions of this spectrum).

These signal-to-noise ratios are then compared with an acceptability threshold.

Following upon the preliminary measurement step (blocks 1000 to 1010 in FIG. 3A), in response to the fact that all the signal-to-noise ratios CleanSignal/Noisy Signal (global or S/N_i) calculated reach the acceptability threshold, it is possible to carry out detection (in substep 2002)—with the light-radiation sources 12*a*, 12*b*, 12*c*, 12*d* activated selectively one after another—of respective light-emission signals Noisy ColorSignal.

In the event of even just one of the aforesaid signal-to-noise ratios failing to reach a respective acceptability threshold, it is possible to implement (see block 1014) measures capable of increasing the intensity (at least relative intensity, with respect to the component of background noise Noise) of the useful signal, and the procedure returns upstream of blocks 1000 and/or 1002.

It is thus possible to repeat the preliminary measurement step (substeps 1000 to 1012 of FIG. 3A) after having increased the intensity of the useful signal.

It is likewise possible to detect any possible conditions of saturation so that it is useful to reduce the signal by moving the sensor S away from the fixture 10 (or 10') or else by widening the focus angle or with other actions complementary with respect to those implemented (as described previously) when instead it is desired to increase the useful signal.

It will be appreciated that saturation is in itself a phenomenon such as to arise when measurement is made using the sensor (not when the ratio is calculated), i.e., in practice, when the sensor reaches the upper measurement threshold.

In the case in point, it is possible to verify whether the signal saturates in the step exemplified in FIG. 3A, for example when the signals Noise (block 1004) or Noisy Signal (block 1006) are measured.

If none of the signals detected saturates, not even the signal-to-noise ratios calculated on the basis of this signals will present problems, and hence there are no saturation problems even in the step exemplified in FIG. 3B.

Saturation proves problematical if it occurs even for just one of the colours: for example, it is possible to use a threshold of 95% saturation of the device, a value that can be generalized.

In the course of the preliminary measurement step (blocks 1000 to 1010 in FIG. 3A), it is possible to obtain the aforesaid respective preliminary clean emission signals CleanSignal simply by subtracting the background-lighting level signal Noise from the aforesaid respective preliminary emission signals Noisy Signal.

In the examples presented herein, the preliminary measurement step of blocks 1000 to 1010 of FIG. 3A may be preparatory to a step of measurement proper of the calibration data of blocks 2000 to 2008 of FIG. 3B, where, after the light-radiation sources 12*a*, 12*b*, 12*c*, 12*d* have been activated for a (pre) warm-up interval (block 2000), the light-radiation sources 12*a*, 12*b*, 12*c*, 12*d* are activated selectively one after another, at the end of the warm-up interval, and respective light-emission signals (i.e., NoisyColorSignal) are detected (block 2002).

In block 2004, the signals NoisyColorSignal are processed on the basis of the background-lighting level signal Noise to obtain as result respective clean emission signals, denoted as CleanColorSignal and used in steps 2006, 2008 for producing the photometric calibration data PD.

For instance, the aforesaid clean emission signals CleanColorSignal may be obtained simply by subtracting the background-lighting level signal Noise from the respective light-emission signals, i.e., Noisy ColorSignal.

Both during the preliminary measurement step of FIG. 3A (block 1010), and in the step of measurement proper of the calibration data of FIG. 3B (block 2006) the clean signals, i.e., CleanSignal or CleanColorSignal, may be converted into a desired quantitative colorimetric value (for example, illuminance) according to the modalities, in themselves known, described in the bibliographical references previously cited.

All the measurements and processing of the data as described may be performed in a completely automated way by the remote controller RC. In practice, of the user there is simply required positioning the sensor S with respect to the lighting fixture 10 and pressing a start button 20 on the remote controller RC, it advantageously being possible to follow instructions provided on a display of the remote controller RC.

In the case of a system or installation comprising a number of lighting fixtures 10, the procedure previously described can be repeated for all the fixtures 10 comprised in the system or installation even operating with just one remote controller RC and just one sensor S, without having to have available specific tools for each fixture 10.

It will be appreciated that the solution described herein makes it possible, even when the behaviour of decay of the various types of sources (LEDs) 12*a*, 12*b*, 12*c*, and 12*d* is not known, to perform, starting from time zero, via a remote controller, a precise and reliable calibration at any moment of the service life of a lighting fixture.

The solution described herein likewise enables cloning of a lighting fixture 10' taken as reference in one or more further fixtures 10 that are calibrated so as to reproduce faithfully the behaviour (emission parameters) of the fixture 10' taken as reference model.

The above result may be obtained by operating with simplified modalities:

- detection of the background-lighting signal Noise,
- detection of the signal Noisy Signal with the fixture 10' activated for producing a mixed radiation (e.g., of a pink colour),
- processing of the signal CleanSignal (for example by simple subtraction) starting from the signal Noisy Signal and the signal Noise,
- calculation of the signal-to-noise ratio CleanSignal/Noisy Signal, and
- possible adjustments (substep 1014) to increase the component of useful signal, possibly reducing the background-lighting level, if the ratio in question does not reach an acceptability threshold (or to reduce the useful signal in the presence of saturation).

In this case, the operation of calculating (in substep 1010) at least one signal-to-noise ratio chosen from among global signal-to-noise ratios over the visible-light spectrum and signal-to-noise ratios referred to respective emission spectra of electrically powered light-radiation sources comprised in the lighting device 10' that is cloned can be reduced to the calculation of just one signal-to-noise ratio referred, for example, to the radiation of the colour red emitted by the above device.

In this case, verifying that all the signal-to-noise ratios calculated reach respective acceptability thresholds amounts to verifying that the above ratio (the only one calculated) reaches a respective acceptability threshold, it thus being possible to use the signal CleanSignal for the production of clones of a device or fixture 10' taken as reference model.

In the same way, verifying that at least one of the signal-to-noise ratios calculated fails to reach the respective acceptability threshold amounts to verifying that the above ratio (the only one calculated) fails to reach the respective acceptability threshold.

The procedures described herein may be installed on the remote controller RC so as to obtain a stand-alone system.

It is thus possible to have available a software code that can be executed on the remote controller RC that is assumed as being coupled to a lighting device or fixture 10 (or 10') that comprises a number of electrically powered light-radiation sources 12*a*, 12*b*, 12*c*, 12*d* having respective light-emission parameters, and to a photometric sensor S positioned with respect to the lighting device or fixture 10 so as to be impinged upon by light radiation emitted by the light-radiation sources 12*a*, 12*b*, 12*c*, 12*d*.

The software code can thus be executed on the remote controller RC to implement the procedures represented by the flowchart of FIGS. 3A and 3B, in particular as regards the operation of detecting (block 1004) the background-lighting level signal Noise that can be used for processing the signals Noisy Signal and Noisy ColorSignal, for producing the photometric calibration data PD as a function of respective clean emission signals CleanSignal or else CleanColorSignal, as well as for calculating the signal-to-noise ratios CleanSignal/Noisy Signal used for establishing whether the ratios calculated are too low and such as to suggest proceeding with measurements (see block 1014) designed to increase the intensity (at least the relative intensity, with respect to the background noise, which it is possible to attempt to reduce, for example by turning off possible sources of disturbance) of the useful signal acquired by the sensor S.

If a situation of saturation is encountered, it is possible to proceed with measurements designed to reduce the useful signal acquired by the sensor S.

If the ratios calculated are adequate (neither too low nor too high) it is possible to proceed with the step of measurement proper (FIG. 3B) or else with an operation of cloning of a device or fixture 10' taken as reference.

It is also possible to resort to a filing on the cloud, enabling the end user to have available a version constantly updated with the intervention each time it is performed and under the supervision of a developer.

The remote controller RC can then be remotely uploaded with the above software (possibly from the cloud), with the corresponding possibility of remote storage (e.g., on the cloud) of the data detected and/or processed during the procedure exemplified in FIGS. 3A and 3B.

Another advantage is afforded by the fact that the data measured may be saved in a centralized database, which can be accessed at any moment, without being constrained to a specific software version of the remote controller RC or of the sensor.

Yet another advantage is afforded by the fact that the remote controller RC can also read the state of the software SW and of calibration of the sensor S, and possibly issue warning/reminder signals, for example on a yearly basis, to indicate to the user the next or last deadline of calibration of the sensor itself.

Without prejudice to the underlying principles, the details of implementation and the embodiments may vary, even significantly, with respect to what has been illustrated herein purely by way of non-limiting example, without thereby departing from the scope of the invention, as this is defined in the annexed claims.

LIST OF REFERENCES

Lighting device 10
Cloned lighting device 10'
Light-radiation sources 12*a*, 12*b*, 12*c*, 12*d*
Activation circuitry 14
Photometric-interface circuitry 16
Calibration circuitry 18
Pushbutton 20
Sensor S
Remote controller RC
Pre-measurement procedure 1000-1012
Data-measurement procedure 2000-2008
Calibration/cloning 2010

The invention claimed is:

1. A method for producing photometric calibration data for a lighting device comprising a plurality of electrically powered light-radiation sources having respective light emission parameters, the method comprising:

positioning a photometric sensor configured to be impinged upon by light radiation emitted by said lighting device;

detecting, via the photometric sensor and with said lighting device de-activated, a background lighting level signal;

detecting, via the photometric sensor with said lighting device activated, light-emission signals;

processing said light-emission signals based on said background lighting level signal, and obtaining clean emission signals as a result;

producing said photometric calibration data based on said clean emission signals;

detecting, via the photometric sensor with said lighting device activated, at least one preliminary light-emission signal;

processing said at least one preliminary light-emission signal based on said background lighting level signal, and obtaining at least one preliminary clean emission signal as a result; and calculating, based on said at least one preliminary clean light emission signal and said background lighting level signal, at least one signal-to-noise ratio selected among global signal-to-noise ratios over a visible light spectrum and signal-to-noise ratios over respective emission spectra of the plurality of electrically powered light radiation sources included in said lighting device with respect to which the photometric sensor has been positioned to be impinged upon by light radiation.

2. The method of claim 1, further comprising, in response to all the signal-to-noise ratios calculated reaching respective acceptability thresholds, proceeding with detecting, via the photometric sensor with said plurality of electrically powered light radiation sources selectively activated, respective light emission signals.

3. The method of claim 1, further comprising, in response to at least one of the signal-to-noise ratios calculated failing to reach a respective acceptability threshold, increasing an intensity of light radiation impinging on the photometric sensor with respect to said background lighting level.

4. The method of claim 1, further comprising obtaining said at least one preliminary clean emission signal by subtracting said background lighting level signal from said at least one preliminary emission signal.

5. The method of claim 1, further comprising calculating said at least one signal-to-noise ratio selected from global signal-to-noise ratios over the visible light spectrum and signal-to-noise ratios over respective emission spectra of the plurality of electrically powered light radiation sources and converting said at least one clean preliminary signal and said background lighting level signal into quantitative colorimetric values, including illuminance values.

6. The method of claim 1, further comprising, in a calibration data measuring phase:

activating for a warm-up interval the plurality of electrically powered light radiation sources included in said lighting device with respect to which the photometric sensor has been positioned to be impinged upon by light radiation, detecting, via the photometric sensor with said plurality of electrically powered light radiation sources selectively activated, at an end of said warm-up interval, respective light emission signals, processing said respective light emission signals based on said background lighting level signal, and obtaining respective clean emission signals as a result, and producing said photometric calibration data based on said respective clean emission signals.

7. The method of claim 6, further comprising obtaining said respective clean emission signals by subtracting said background lighting level signal from said respective light emission signals.

8. The method of claim 6, further comprising obtaining said respective clean emission signals by converting said respective light emission signals and said background lighting level signal into quantitative colorimetric values, including illuminance values.

9. The method of claim 6 further comprising, in response to detecting that said photometric sensor has reached a saturation threshold, reducing an intensity of the light radiation impinging on the photometric sensor.

10. A computer program product comprising software code that can be executed in a processor device using the method according to claim 1, coupled to the lighting device comprising the plurality of electrically powered light radiation sources having respective light emission parameters and the photometric sensor positioned with respect to the lighting device to be impinged upon by light radiation emitted by said lighting device, wherein, when the product is executed on said processor device, the processor device performs said operations of detecting the background lighting level signal, detecting light emission signals, processing said light emission signals based on said background lighting level signal, and producing said photometric calibration data based on said clean emission signals.

11. A processor device configured to execute the computer program product according to claim 10 with the processor device coupled to the lighting device comprising the plurality of electrically powered light radiation sources having respective light emission parameters and the photometric sensor positioned with respect to the lighting device to be impinged upon by light radiation emitted by said lighting device.

12. The processor device of claim 11, wherein the processor device is configured to be remotely uploaded with the computer program product according to claim 10.

* * * * *